United States Patent
Katahira et al.

(10) Patent No.: US 12,111,117 B2
(45) Date of Patent: Oct. 8, 2024

(54) DOUBLE PIPE FOR HEAT EXCHANGER

(71) Applicant: UACJ Corporation, Tokyo (JP)

(72) Inventors: Shiro Katahira, Tokyo (JP); Tetsuro Hata, Tokyo (JP); Takuro Nakamura, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 302 days.

(21) Appl. No.: 17/757,109

(22) PCT Filed: Dec. 8, 2020

(86) PCT No.: PCT/JP2020/045693
§ 371 (c)(1),
(2) Date: Jun. 9, 2022

(87) PCT Pub. No.: WO2021/117725
PCT Pub. Date: Jun. 17, 2021

(65) Prior Publication Data
US 2023/0003456 A1    Jan. 5, 2023

(30) Foreign Application Priority Data
Dec. 13, 2019   (JP) .................................. 2019-225888

(51) Int. Cl.
*F28D 7/10*        (2006.01)
*F28F 1/06*        (2006.01)
(Continued)

(52) U.S. Cl.
CPC .............. *F28D 7/106* (2013.01); *F28F 1/426* (2013.01); *F16L 9/18* (2013.01); *F28F 1/06* (2013.01); *F28F 1/08* (2013.01); *F28F 2210/06* (2013.01)

(58) Field of Classification Search
CPC ..... F28D 7/106; F28F 1/06; F28F 1/08; F28F 2210/06; F16L 9/18
See application file for complete search history.

(56) References Cited

U.S. PATENT DOCUMENTS

| | | | | |
|---|---|---|---|---|
| 910,192 A | * | 1/1909 | Lam .................. | F28F 13/12 D25/120 |
| 4,715,436 A | * | 12/1987 | Takahashi ............... | B21C 37/20 165/184 |

(Continued)

FOREIGN PATENT DOCUMENTS

| | | |
|---|---|---|
| JP | S5737690 A | 3/1982 |
| JP | S60256798 A | 12/1985 |

(Continued)

OTHER PUBLICATIONS

English translation of the Written Opinion of the International Searching Authority in parent application No. PCT/JP2020/045693.

(Continued)

*Primary Examiner* — Paul Alvare
(74) *Attorney, Agent, or Firm* — J-TEK LAW PLLC; Jeffrey D. Tekanic; Scott T. Wakeman

(57) ABSTRACT

A double pipe for a heat exchanger includes an inner pipe disposed in an outer pipe. In a straight-pipe portion of the double pipe, the inner pipe has a plurality of protruding parts extending in a helically offset manner along a longitudinal direction, an inner-circumferential surface of the outer pipe directly contacts the protruding parts, and outer-side channels are partitioned at a plurality of locations in a circumferential direction of the double pipe. The protruding parts are curved to protrude radially outward. In a cross section of the straight-pipe portion orthogonal to the longitudinal direction, the inner-circumferential surface of the outer pipe is circular, and an average value of D/L values of all the outer-side channels is 0.09-0.20, wherein D is defined as a maximum depth of each of the outer-side channels and L is defined as an arc length of each of the outer-side channels in the circumferential direction.

17 Claims, 13 Drawing Sheets

(51) Int. Cl.
   *F28F 1/08*   (2006.01)
   *F28F 1/42*   (2006.01)
   *F16L 9/18*   (2006.01)

(56) References Cited

U.S. PATENT DOCUMENTS

| | | | |
|---|---|---|---|
| 4,794,983 A * | 1/1989 | Yoshida | F28D 15/046 |
| | | | 165/133 |
| 5,573,062 A * | 11/1996 | Ooba | B21C 37/16 |
| | | | 165/184 |
| 5,992,512 A * | 11/1999 | Tsuri | B21C 37/207 |
| | | | 165/184 |
| 6,920,917 B2 | 7/2005 | Inoue et al. | |
| 2005/0051310 A1 | 3/2005 | Inoue et al. | |
| 2005/0056409 A1 | 3/2005 | Foli | |
| 2006/0096314 A1 | 5/2006 | Nakamura et al. | |
| 2006/0096744 A1 | 5/2006 | Nakamura et al. | |
| 2006/0112556 A1 | 6/2006 | Nakamura et al. | |
| 2009/0159248 A1 * | 6/2009 | Mimitz, Sr. | F28F 21/086 |
| | | | 165/177 |
| 2009/0166019 A1 * | 7/2009 | Tokizaki | F28F 1/422 |
| | | | 165/181 |
| 2010/0230082 A1 * | 9/2010 | Patel | F28F 1/08 |
| | | | 29/890.036 |
| 2011/0073208 A1 * | 3/2011 | Nakamura | F16L 9/18 |
| | | | 138/114 |
| 2013/0192804 A1 * | 8/2013 | Matsuda | F28D 7/10 |
| | | | 165/154 |
| 2014/0109373 A1 | 4/2014 | Nakamura et al. | |
| 2015/0362174 A1 * | 12/2015 | Sung | F28F 13/12 |
| | | | 122/235.12 |
| 2019/0345937 A1 * | 11/2019 | Sato | F25B 41/42 |
| 2020/0166281 A1 * | 5/2020 | Oono | F28F 1/40 |
| 2020/0248845 A1 * | 8/2020 | Cho | F25B 41/00 |
| 2021/0172684 A1 * | 6/2021 | Nakamura | F28D 7/14 |
| 2022/0290925 A1 * | 9/2022 | Katahira | F28F 1/08 |

FOREIGN PATENT DOCUMENTS

| | | |
|---|---|---|
| JP | 2002318015 A | 10/2002 |
| JP | 2004190923 A | 7/2004 |
| JP | 2006162241 A | 6/2006 |
| JP | 2007506066 A | 3/2007 |
| JP | 2012052784 A | 3/2012 |
| JP | 2013113525 A | 6/2013 |
| JP | 2013178079 A | 9/2013 |
| WO | 2012017777 A1 | 2/2012 |
| WO | 2021079877 A1 | 4/2021 |

OTHER PUBLICATIONS

English translation of the International Search Report dispatched Jun. 17, 2021, in parent application No. PCT/JP2020/045693.
Unpublished U.S. Appl. No. 17/753,148.

* cited by examiner

DOUBLE PIPE FOR HEAT EXCHANGER

CROSS-REFERENCE

This application is the US national stage of International Patent Application No. PCT/JP2020/045693 filed on Dec. 8, 2020, which claims priority to Japanese Patent Application No. 2019-225888 filed on Dec. 13, 2019.

TECHNICAL FIELD

The present invention relates to a double pipe for a heat exchanger.

BACKGROUND ART

The heat-exchange cycle (also called a refrigeration cycle) of an automotive air-conditioning system or the like comprises a condenser, an evaporator, a compressor, and an expansion valve. Freon, $CO_2$, ammonia, or some other refrigerant circulates in a circulation channel that connects these. In such a heat-exchange cycle, it has been proposed (refer to Patent Document 1) to improve heat-exchanging performance by disposing a double pipe in the circulation channel and effecting heat exchange by causing a high-temperature refrigerant, which is discharged from the condenser, and a low-temperature refrigerant, which is discharged from the evaporator, to circulate in opposition to each other in two streams of space configured by the double pipe.

On the other hand, to address environmental problems, refrigerants having a lower global warming potential are being studied for use as refrigerants to be used in the heat-exchange cycle. There is a concern that the heat-exchanging performance of a refrigerant that takes such environmental problems into consideration will be lower than that of current refrigerants. Consequently, to curtail performance deterioration of the heat-exchange cycle overall, it is effective to proactively utilize a configuration that further improves heat-exchanging performance by incorporating the above-mentioned double pipe.

In a system that uses a compressor to compress a gas refrigerant discharged from the evaporator, a malfunction can occur, in which the heat exchange cannot be performed sufficiently, in a situation in which the refrigerant has flowed into the compressor in the state in which the refrigerant has not been sufficiently evaporated, i.e., in the state in which liquid is mixed with the gas. However, this malfunction can be resolved by incorporating the double pipe. This is because, in the double pipe, the refrigerant can be heated before it is caused to flow into the compressor, and thereby the refrigerant can be sufficiently evaporated.

Here, with regard to the double pipe described in Patent Document 1, an inner pipe having a plurality of helical groove portions is used as an inner pipe, and this is combined with a smooth, circular-tube-shaped outer pipe. Furthermore, in a straight-pipe part of the double pipe, the inner diameter of the outer pipe is larger than the outer diameter of the inner pipe, and a ridge portion between the groove portions of the inner pipe does not make contact with the outer pipe. Thereby, in the straight-pipe part of the double pipe, the groove portions communicate with one another in a circumferential direction, and an outer-side channel, which is formed between the outer pipe and the inner pipe, is formed over the entire circumference.

PRIOR ART LITERATURE

Patent Documents

Patent Document 1
Japanese Laid-open Patent Publication 2006-162241

SUMMARY OF THE INVENTION

Problems to be Solved by the Invention

With regard to the double pipe described in Patent Document 1, in the straight-pipe part the inner diameter of the outer pipe is larger than the outer diameter of the inner pipe, as described above, the outer-side channel is one of the channels extending in the circumferential direction, and the channel cross-sectional area is larger than that of a bent portion. Consequently, the flow velocity of the refrigerant in the outer-side channel tends to drop in the straight-pipe part, and therefore there is a possibility that sufficient heat-exchanging performance of the straight-pipe part will not be obtained.

With regard to the double pipe for exchanging heat, even though it has a bent portion in one part, because the majority thereof is constituted by the straight-pipe part it is conceivable that the heat-exchanging performance of the double pipe overall can be improved by improving the heat-exchanging performance of the straight-pipe part. On the other hand, even though it is considered that other optimizations, such as flow velocity, channel surface area and pressure drop in the inner-side channel, which is the channel inside the inner pipe, etc., and in the outer-side channel, as well as optimization of the channel cross-sectional shape, etc., will have an effect on the heat-exchanging performance of the double pipe, it cannot be said that the optimal conditions have been clarified yet. In particular, an effective channel cross-sectional shape of the outer-side channel has not been sufficiently elucidated.

It is one non-limiting aspect of the present teachings to disclose techniques for improving a double pipe for a heat exchanger in which the heat-exchanging performance can be improved as compared to known double pipes by optimizing the channel cross-sectional shape of outer-side channels in the straight-pipe part.

In one non-limiting embodiment of the present teachings, a double pipe for a heat exchanger has a double-pipe structure, in which an inner pipe is disposed in the interior of an outer pipe, to effect heat exchange between a fluid that flows in the interior of the inner pipe and a fluid that flows between the inner pipe and the outer pipe, wherein:

in a straight-pipe part of the double pipe for a heat exchanger, the inner pipe comprises a plurality of protruding parts extending in a longitudinal direction and curved to protrude toward an outer-circumference side;

the protruding parts are helically offset in the longitudinal direction;

in a cross section of the straight-pipe part orthogonal to the longitudinal direction, an inner-circumferential surface of the outer pipe exhibits a circular shape;

in the straight-pipe part, the inner-circumferential surface of the outer pipe and the protruding parts of the inner pipe are in contact, and outer-side channels, which are partitioned at a plurality of locations in the circumferential direction, are formed between the outer pipe and the inner pipe; and in a cross section of the straight-pipe part orthogonal to the longitudinal direction, when D [mm] is defined as the maximum depth of each of the outer-side channels and L [mm] is defined as the arc length of each of the outer-side channels in the circumferential direction, the average value of the D/L values of all the outer-side channels is greater than 0.09 and less than 0.20.

In the straight-pipe part of the double pipe for a heat exchanger, the inner-circumferential surface of the outer pipe and the protruding parts of the inner pipe are in contact, and the outer-side channels, which are partitioned at a plurality of locations in the circumferential direction, are formed between the outer pipe and the inner pipe. In this manner, in the straight-pipe part, by forming the outer-side channels such that they are divided up in the circumferential direction, the flow velocity of the fluid flowing through the outer-side channels in the straight-pipe part can be ensured, and thereby the heat-exchanging performance of the straight-pipe part can be improved.

In addition, in a cross section of the straight-pipe part orthogonal to the longitudinal direction, when D [mm] is defined as the maximum depth of each of the outer-side channels and L [mm] is defined as the arc length of each of the outer-side channels in the circumferential direction, the average value of the D/L values of all the outer-side channels is greater than 0.09 and less than 0.20. That is, in the straight-pipe part, each of the outer-side channels is formed such that its depth becomes small to a certain extent and its arc length in the circumferential direction becomes long. For that reason, in the straight-pipe part, the contact surface area between the fluid that flows in the outer-side channels and the outer pipe and the contact surface area between the fluid that flows in the outer-side channels and the inner pipe can be increased. Thereby, the heat-exchanging performance of the straight-pipe part can be improved.

In addition, in a cross section of the straight-pipe part, by virtue of setting the average value of the D/L values of all the outer-side channels to a value that is greater than 0.09, an increase in the pressure drop of the fluid that flows in each of the outer-side channels in the straight-pipe part can be curtailed. Furthermore, in a cross section of the straight-pipe part, by setting the above-mentioned average value to a value of less than 0.20, an increase in the pressure drop of the fluid that flows in the inner pipe in the straight-pipe part can be curtailed.

According to the present aspect as described above, a double pipe for a heat exchanger can be provided in which the channel cross-sectional shape of outer-side channels in a straight-pipe part are optimized, and thereby the heat-exchanging performance can be improved beyond that in the past.

DETAILED DESCRIPTION

Figure 1:
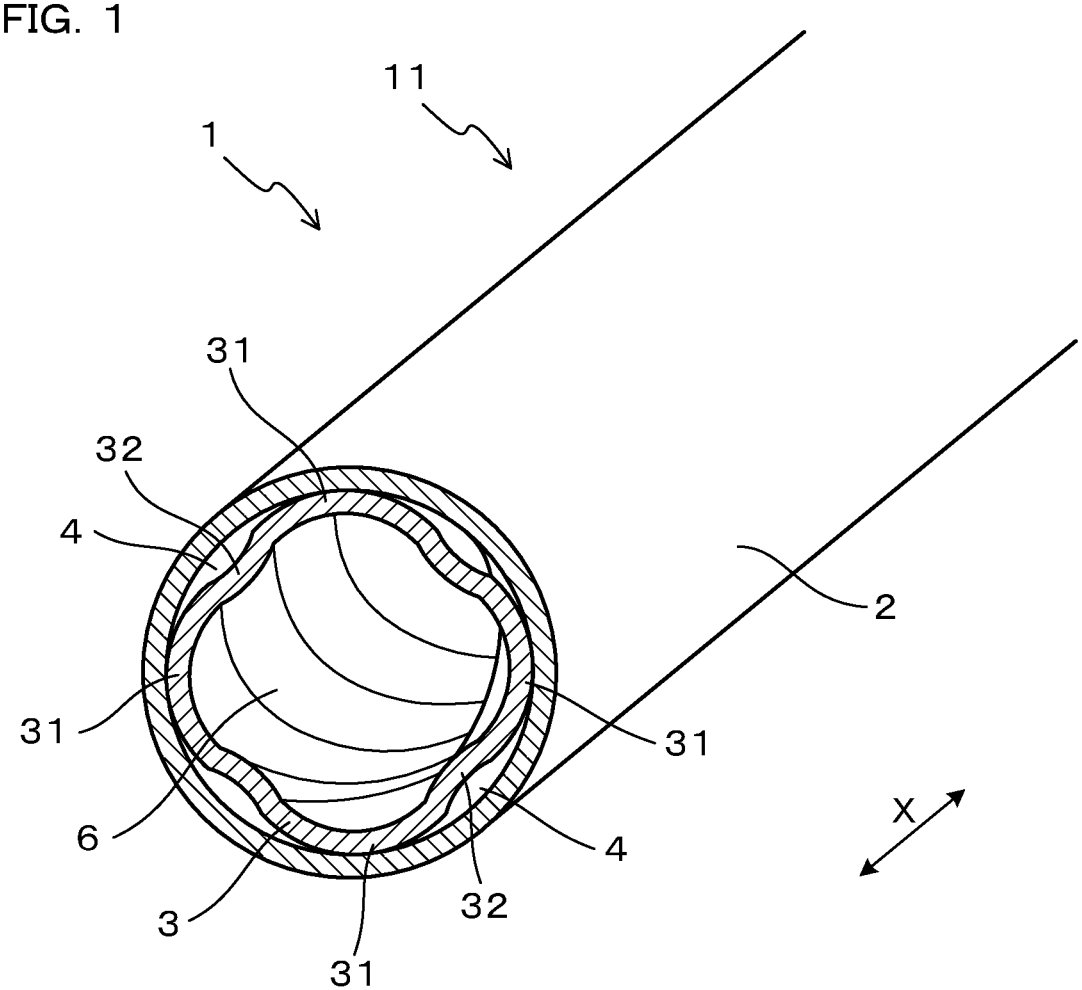
FIG. 1 is a partial, cross-sectional oblique view of a double pipe for a heat exchanger according to Working Example 1.

The above-mentioned double pipe for a heat exchanger may be configured such that it can be incorporated in, for example, an air-conditioning system for an automobile or the like. The air-conditioning system may comprise a condenser, an evaporator, a compressor, an expansion valve, and a circulation channel, which couples these, and may be configured such that the double pipe for a heat exchanger is disposed in the circulation channel. In this situation, the double pipe for a heat exchanger should be incorporated in the circulation channel such that a low-temperature/low-pressure gas refrigerant, which is discharged from the evaporator, is guided to a channel within an inner pipe, a high-temperature/high-pressure liquid refrigerant, which is discharged from the condenser, is guided to outer-side channels, and the liquid refrigerant that flows in the outer-side channels and the gas refrigerant that flows in the inner pipe flow in directions that are in opposition to each other. By virtue of the circulation channel being configured in this manner, heat exchange in the double pipe for a heat exchanger between the high-temperature/high-pressure liquid refrigerant and the low-temperature/low-pressure gas refrigerant is performed efficiently, and thereby the heat-exchanging performance of the heat-exchange cycle overall can be improved.

The double pipe for a heat exchanger is configured such that the average value of the D/L values of all the outer-side channels in a cross section of a straight-pipe part orthogonal to a longitudinal direction is greater than 0.09 and less than 0.20. By setting the average value of the D/L values of the outer-side channels to the above-mentioned specific range, as described above, an increase in the pressure drop of the fluid that flows in each of the outer-side channels of the straight-pipe part can be curtailed, and an increase in the pressure drop of the fluid that flows in the inner pipe can be curtailed. From the viewpoint of more reliably exhibiting such functions and effects, in a cross section of the straight-pipe part orthogonal to the longitudinal direction, the average value of the D/L values of all the outer-side channels preferably is set to greater than 0.10 and less than 0.20, more preferably is set to greater than 0.11 and less than 0.20, yet more preferably is set to greater than 0.12 and less than 0.20, yet more preferably is set to greater than 0.13 and less than 0.19, and in particular preferably is set to greater than 0.13 and less than 0.18.

If the double pipe for a heat exchanger comprises the straight-pipe part extending in a straight line, then a portion (one location or a plurality of locations) may be bent by bending work or the like. In this situation, at least in a cross section of the straight-pipe part of the double pipe orthogonal to the longitudinal direction, the average value of the D/L values of all the outer-side channels may be set to a value of greater than 0.09 and less than 0.20. Thereby, the heat-exchanging performance of the straight-pipe part, which occupies the majority of the double pipe for a heat exchanger, can be improved, and a reduction in the pressure drop can be achieved.

An outer pipe and protruding parts of the double pipe for a heat exchanger may be brought into contact with each other by swaging the outer pipe toward the inner pipe. In this situation, the outer pipe and the protruding parts can easily be brought directly into contact with each other, and thereby the manufacturability of the double pipe for a heat exchanger, which comprises the outer-side channels partitioned at a plurality of locations in the circumferential direction, can be improved.

In the cross section of the straight-pipe part orthogonal to the longitudinal direction, a total of arc lengths L of all the outer-side channels preferably is 60% or more of a circumferential length C of a virtual circumscribed circle of the inner pipe. Thus, by forming the outer-side channels in the straight-pipe part over a large region in the circumferential direction, the heat-exchanging performance of the straight-pipe part can be improved, and a reduction in the pressure drop can be achieved. In addition, in a cross section of the straight-pipe part orthogonal to the longitudinal direction, the total of arc lengths L of all the outer-side channels is preferably set to 90% or less of circumferential length C of a circumscribed circle of the inner pipe. In this situation, the contact width of contact parts between the inner pipe and the outer pipe can be easily assured, and thereby the outer-circumferential channel can be divided reliably.

In the straight-pipe part, the number of the protruding parts provided on the inner pipe is preferably four locations or more and six locations or fewer. By virtue of setting the number of the protruding parts to four locations or more, the flow velocity of the outer-side channels of the straight-pipe part can be easily increased, and thereby heat-exchanging performance can be greatly improved. In addition, by setting the number of the protruding parts to six locations or fewer, it is possible to curtail an excessive increase in the pressure drop caused by the outer-side channels of the straight-pipe part having been divided up at numerous locations in the circumferential direction.

In a cross section of the straight-pipe part of the double pipe for a heat exchanger orthogonal to the longitudinal direction, the plurality of protruding parts is preferably formed equispaced. Thereby, the refrigerant flow volumes of the outer-side channels become amounts that are substantially equal in the circumferential direction. Consequently, it becomes easy to curtail non uniformity in heat exchange between the refrigerant that flows through the outer-side channels and the refrigerant that flows through the channel inside the inner pipe.

The spiral angle of each of the protruding parts of the straight-pipe part is preferably 20° or more and 60° or less. The spiral angle is the angle formed by the forming direction of the protruding parts and a straight line parallel to the longitudinal direction of the double pipe for a heat exchanger. By setting the spiral angle to 20° or more, it becomes easy to increase the contact portions between each of the outer-side channels and the inner pipe, and thereby it becomes easy to improve heat-exchanging performance. By setting the spiral angle to 60° or less, it is possible to curtail the pressure drop of the refrigerant that flows in the outer-side channels from becoming excessively large.

The boundary part between each of the protruding parts on the outer-circumferential surface of the inner pipe and each of the helical recessed parts can be formed in an angular shape. Here, "angular shape" refers to the state in which the radius of curvature of each of the protruding parts and the radius of curvature of each of the helical recessed parts changes in a step shape, with the boundary part as the boundary. In the situation in which each of the boundary parts has an angular shape, the protruding part tends to manifest such that it protrudes sufficiently toward the outer-circumference side relative to the helical recessed part, and the radius of curvature tends to become small. Consequently, in the situation in which the boundary parts are formed having an angular shape, the protruding parts and the outer pipe can be easily brought into tight contact reliably, and thereby the outer-side channels can be divided up reliably in the circumferential direction.

WORKING EXAMPLES

Working Example 1

A working example of the double pipe for a heat exchanger will now be explained, with reference to FIG. 1 to FIG. 5.

Figure 2:
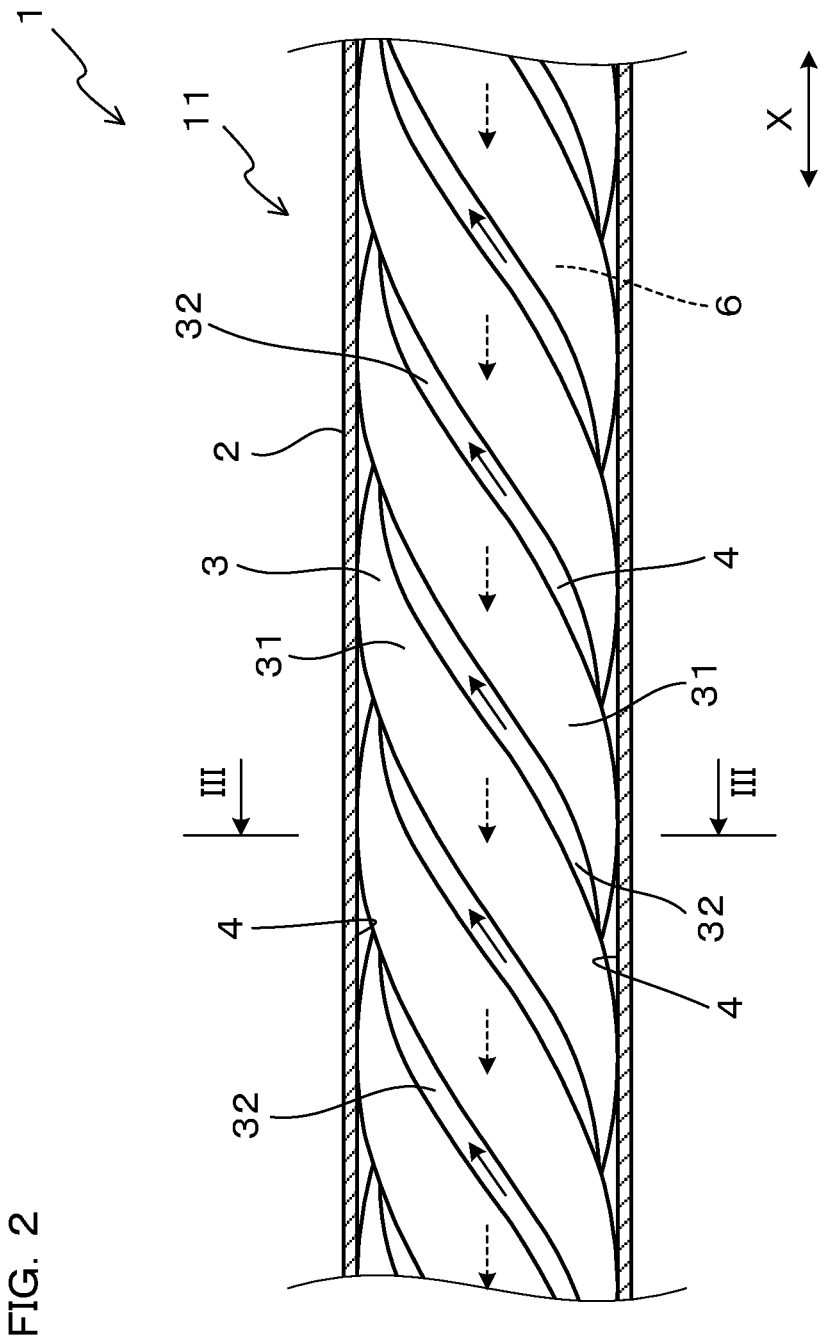
FIG. 2 is a partial, cross-sectional side view of the double pipe for a heat exchanger according to Working Example 1.

As shown in FIG. 1 and FIG. 2, a double pipe 1 for a heat exchanger (hereinbelow, may also be simply called double pipe 1) of the present example has a double-pipe structure in which an inner pipe 3 is disposed in the interior of an outer pipe 2. The double pipe 1 is used to effect heat exchange between the fluid that flows in the interior of the inner pipe 3 and the fluid that flows between the inner pipe 3 and the outer pipe 2.

Figure 3:
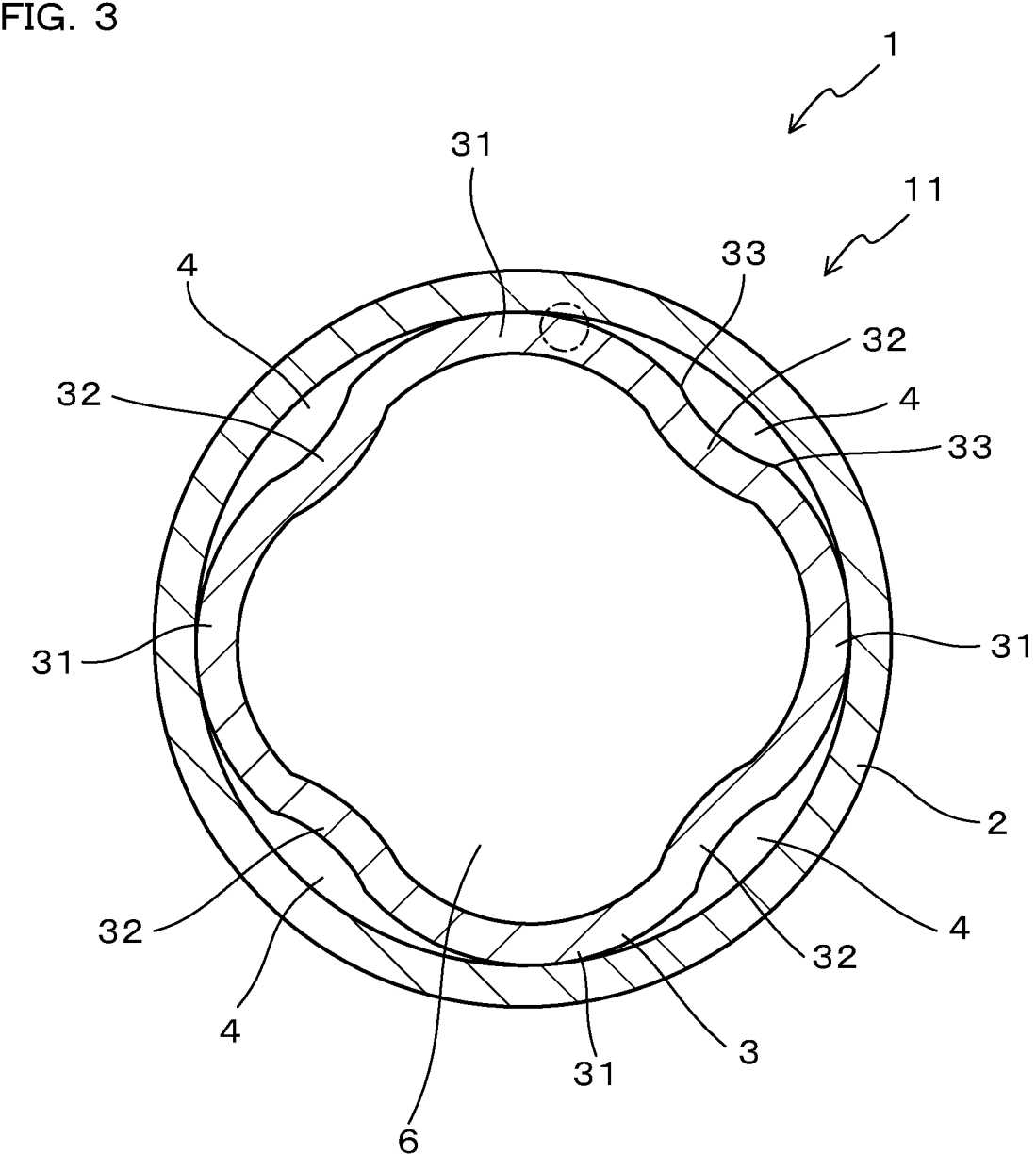
FIG. 3 is a cross-sectional auxiliary view taken along line in FIG. 2.
Figure 4:
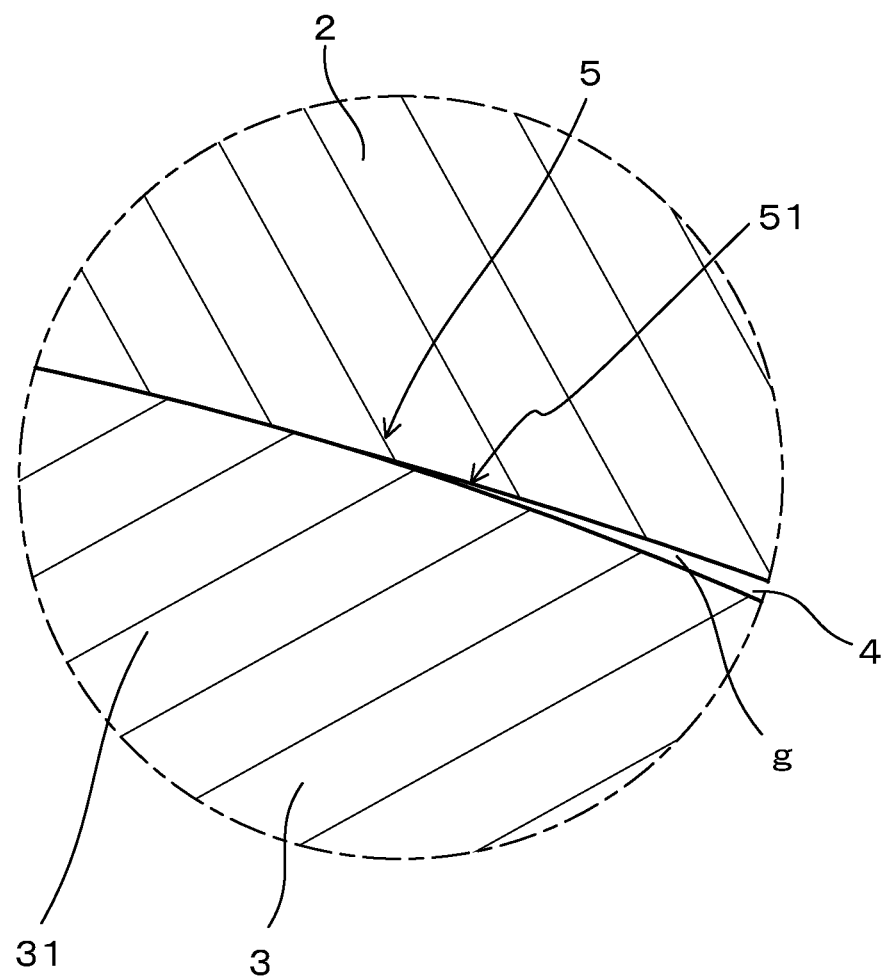
FIG. 4 is an enlarged view of a portion, which is surrounded by a chain line, of FIG. 3.

As shown in FIG. 1 and FIG. 3, in a straight-pipe part 11 of the double pipe 1, the inner pipe 3 comprises a plurality of protruding parts 31, the protruding parts 31 being curved such that they protrude toward the outer-circumference side and extend in the longitudinal direction (hereinbelow, called "X direction") of the double pipe 1. As shown in FIG. 2, the protruding parts 31 are helically offset in the X direction. As shown in FIG. 1 and FIG. 3, in a cross section of the straight-pipe part 11 orthogonal to the X direction, an inner-circumferential surface of the outer pipe 2 (i.e., an inner-circumferential end edge of the outer pipe 2) exhibits a circular shape.

Figure 5:
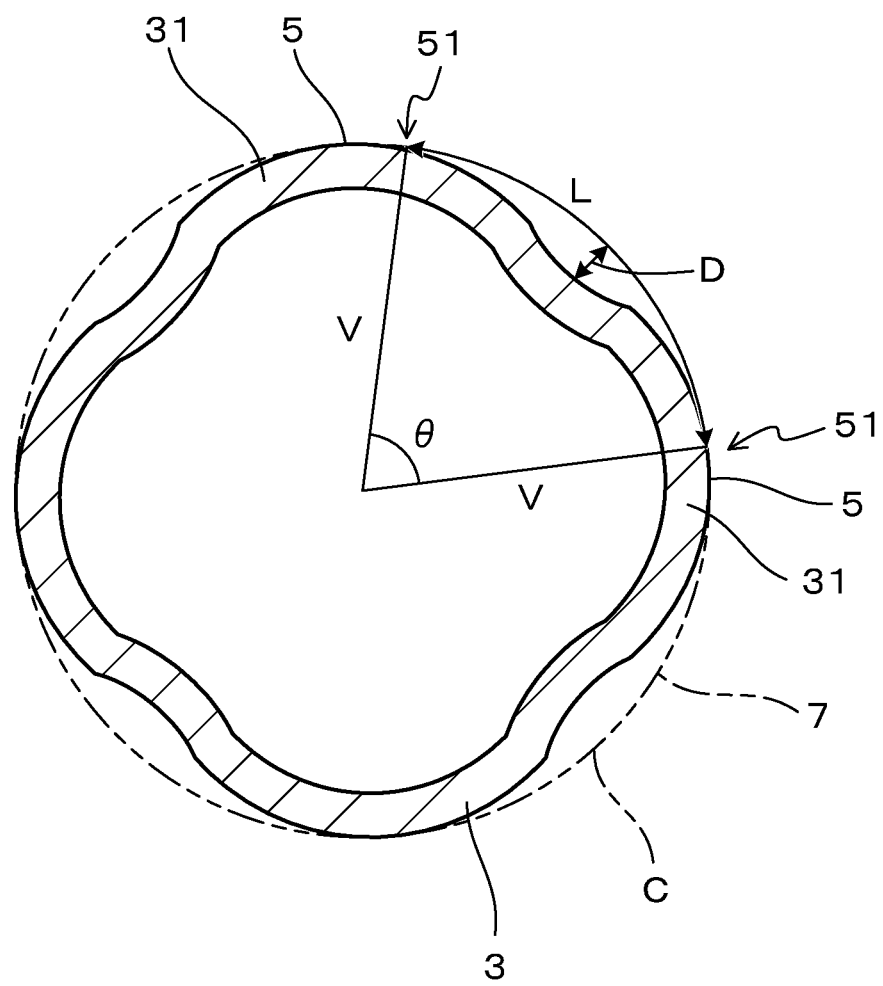
FIG. 5 is a cross-sectional view of an inner pipe for explaining a maximum depth D of outer-side channels and an arc length L in a circumferential direction according to Working Example 1.

As shown in FIG. 1 to FIG. 3, in the straight-pipe part 11 of the double pipe 1, the inner-circumferential surface of the outer pipe 2 and the protruding parts 31 of the inner pipe 3 are in contact, and outer-side channels 4, which are partitioned at a plurality of locations in the circumferential direction, are formed between the outer pipe 2 and the inner pipe 3. As shown in FIG. 5, in a cross section of the straight-pipe part 11 orthogonal to the X direction, when D [mm] is defined as the maximum depth of each of the outer-side channels 4 and L [mm] is defined as the arc length of each of the outer-side channels 4 in the circumferential direction, the average value of the D/L values of all the outer-side channels 4 is greater than 0.09 and less than 0.20.

In the following, the double pipe 1 of the present example will be explained.

Hereinafter, when it simply refers to "circumferential direction", it means the circumferential direction of the double pipe 1, unless otherwise specified in particular, and when it simply refers to "radial direction", it means a radial direction of the double pipe 1, unless otherwise specified in particular.

As shown in FIG. 1 and FIG. 2, the outer pipe 2 and the inner pipe 3 are each constituted by forming, for example, 1000-series pure aluminum, 3000-series aluminum alloy, 5000-series aluminum alloy, or the like into a pipe shape. It is noted that, without limitation, the outer pipe 2 and the inner pipe 3 can also be composed of other metals or the like that excel in thermal conductivity. The double pipe 1 of the present example is formed such that the outer pipe 2 is brought into contact with all the protruding parts 31 by inserting the inner pipe 3 into the outer pipe 2 and then compressing the outer pipe 2 such that the entire circumference thereof is reduced in diameter toward the inner-circumference side. Then, the region, which is interposed between the outer pipe 2 and the inner pipe 3, becomes the outer-side channels 4, and the interior of the inner pipe 3 becomes an inner-side channel 6.

As shown in FIG. 2, the circulation channels of the refrigerants are configured such that, during usage of the double pipe 1, the direction of the refrigerant that flows in the inner-side channel 6 and the direction of the refrigerant that flows in the outer-side channels 4 are directions opposite to each other. In FIG. 2, the direction of the refrigerant that flows in the inner-side channel 6 is indicated by broken-line arrows, and the direction of the refrigerant that flows in the outer-side channels 4 is indicated by solid-line arrows.

As shown in FIG. 1, the outer pipe 2 is a smooth pipe in which the cross-sectional shape orthogonal to the X direction is a circular-ring shape. On the other hand, the inner pipe 3 is formed such that the cross-sectional shape orthogonal to the X direction becomes a recess-protrusion shape, as shown in FIG. 3. When the cross-sectional shape of the inner pipe 3 of the straight-pipe part 11 is observed at various locations in the X direction, the cross-sectional shape at every location in the X direction substantially coincides with the shape obtained when the cross-sectional shape at another location has been rotated in the circumferential direction.

The inner pipe 3 comprises four helical recessed parts 32 for forming the outer-side channels 4 between the inner pipe 3 and the outer pipe 2. As shown in FIG. 2, each of the helical recessed parts 32 is formed in a helical shape such that it advances in one of the X directions while the outer surface of the inner pipe 3 turns in the circumferential direction. The angle formed by the formation direction of the helical recessed parts 32 and a straight line parallel to the X direction, i.e., the spiral angle of the helical recessed parts 32, is 20° or more and 60° or less. As shown in FIG. 1 and FIG. 3, each of the helical recessed parts 32 is formed into a curved-surface shape that is curved such that it becomes a protrusion on the inner-circumference side.

Figure 6:
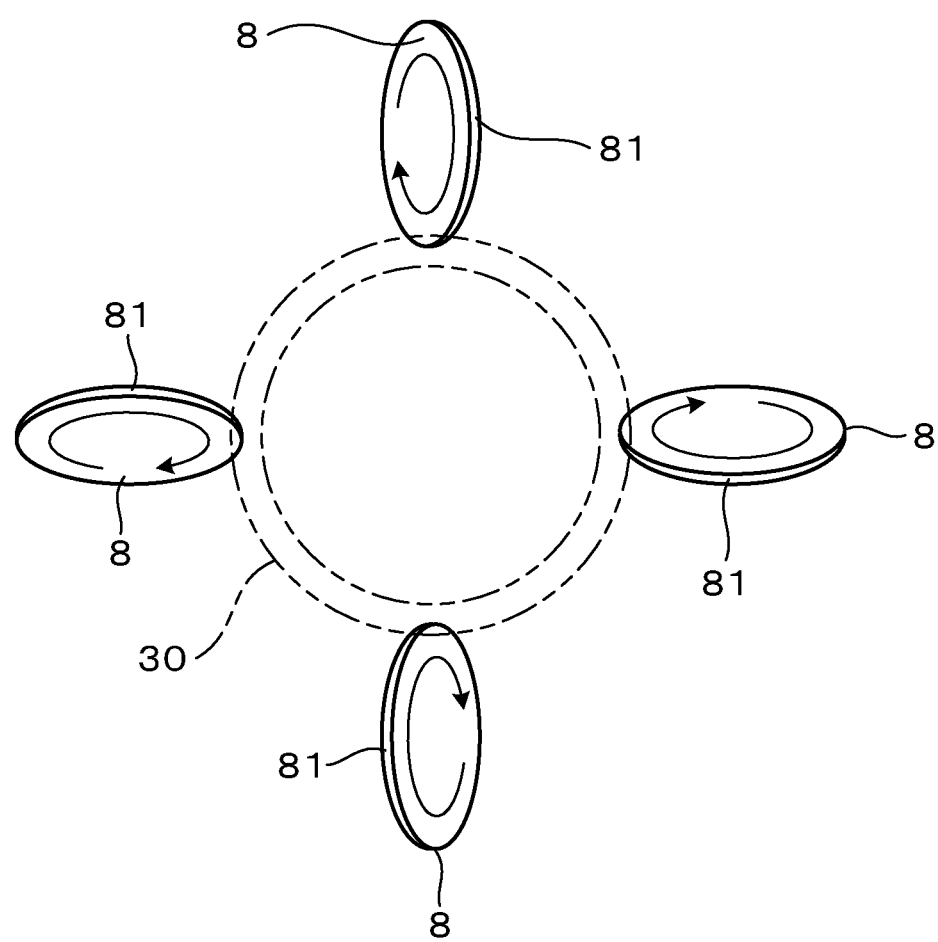
FIG. 6 is an explanatory diagram that shows an aspect, viewed from a longitudinal direction of a pipe stock of the inner pipe, of the arrangement of pressing disks according to Working Example 1.

The inner pipe 3, which comprises the protruding parts 31 and the helical recessed parts 32, can be manufactured, for example, as follows. First, a pipe stock 30 is prepared having a smooth-pipe shape in which the cross-sectional shape is a circular-ring shape, as shown by chain double-dashed lines in FIG. 6. Then, by passing the pipe stock 30 through a region surrounded by four pressing disks 8, which are described below, positions that will become the helical recessed parts 32 of the pipe stock 30 are caused to deform.

Here, four of the pressing disks 8 are disposed equispaced in the circumferential direction. Each of the pressing disks 8 has a disk shape and is provided in a manner freely rotatable in the circumferential direction of the pressing disk 8. Each of the pressing disks 8 is tilted relative to the longitudinal direction of the pipe stock 30. That is, each of the pressing disks 8 is tilted such that the helical recessed parts 32 having the spiral angle described above can be formed. In addition, in order to press the pipe stock 30 toward the inner-circumference side when causing the pipe stock 30 to pass through the regions surrounded by the pressing disks 8, each of the pressing disks 8 is disposed such that a portion of the pressing disk 8 protrudes toward the inner-circumference side of the outer-circumferential surface of the pipe stock 30.

Then, by causing the pipe stock 30 to pass through the space surrounded by the four pressing disks 8, side-surface parts 81 of the pressing disks 8 press the pipe stock 30 toward the inner-circumference side while the pressing disks 8 rotate. Thereby, the helical recessed parts 32 are formed on the pipe stock 30. Furthermore, the positions in which the helical recessed parts 32 were not formed, i.e., the positions between adjacent helical recessed parts 32 of the inner pipe 3 in the circumferential direction, become the protruding parts 31, which are formed such that they conform to the helical recessed parts 32. It is noted that, at the same time as when the helical recessed parts 32 are formed, the protruding parts 31 are also deformed such that they follow the deformation of the helical recessed parts 32, and thereby each of the protruding parts 31 is formed such that the radius of curvature of the protruding part 31 becomes smaller than the radius of curvature of the pipe stock 30. The deeper the helical recessed parts 32 are formed, the smaller the radius of curvature of the protruding parts 31. The inner pipe 3 can be manufactured as above.

As shown in FIG. 1 and FIG. 3, the inner pipe 3 comprises the protruding parts 31 that, in a cross-sectional shape orthogonal to the X direction, are equispaced at four locations in the circumferential direction. Each of the protruding parts 31 is a region that, in a cross-sectional shape of the inner pipe 3 orthogonal to the X direction, protrudes toward the outer-circumference side of the region adjacent in the circumferential direction. The spiral angle of the protruding parts 31 is 20° or more and 60° or less, the same as the spiral angle of the helical recessed parts 32. Each of the protruding parts 31 of the inner pipe 3 is formed into a curved-surface shape that is curved such that it becomes a protrusion on the outer-circumference side.

As shown in FIG. 3, boundary parts 33, which are between the protruding parts 31 and the helical recessed parts 32 on the outer-circumferential surface of the inner pipe 3, are formed into angular shapes. For example, in the process of manufacturing the inner pipe 3 as described above, the angular-shaped boundary parts 33 are formed by the pressing amount of the pipe stock 30 by the pressing disks 8 being sufficient. That is, in the situation in which the boundary parts 33 have become an angular shape, the protruding parts 31 tend to be revealed such that they protrude sufficiently toward the outer-circumference side relative to the helical recessed parts 32, and the radius of curvature tends to become small. Consequently, in the situation in which the angular-shaped boundary parts 33 are formed, the protruding parts 31 and the outer pipe 2 can be easily brought into tight contact in a reliable manner, and the outer-side channels 4 can be divided up in the circumferential direction in a reliable manner.

As shown in FIG. 3, all the protruding parts 31 make contact with the inner-circumferential surface of the outer pipe 2. All the protruding parts 31 make contact with the inner-circumferential surface of the outer pipe 2 at least over the entire region of the straight-pipe part 11 of the double pipe 1 in the X direction; in the present example, all the protruding parts 31 make contact with the inner-circumferential surface of the outer pipe 2 over the entire region in which the protruding parts 31 exist in the X direction. That is, in the situation in which a portion of the double pipe 1 is bent, even in that bent portion, all the protruding parts 31 make contact with the inner-circumferential surface of the outer pipe 2.

As shown in FIG. 3, the protruding parts 31 are formed such that they are curved to conform to the inner-circumferential surface of the outer pipe 2 (i.e., such that the difference between the radius of curvature of the protruding parts 31 and the radius of curvature of the inner-circumferential surface of the outer pipe 2 becomes a prescribed value or greater); thereby, the contact width between each of the protruding parts 31 and the outer pipe 2 becomes easy to ensure. In addition, in a cross section of the straight-pipe part 11 orthogonal to the X direction, the total length of the contact widths between the protruding parts 31 and the outer pipe 2 is preferably 80% or less of circumferential length C of a virtual circumscribed circle of the inner pipe 3. Thereby, the length of each of the outer-side channels 4 in the circumferential direction can be ensured, heat-exchanging performance can be improved, and a reduction in the pressure drop of the refrigerant that flows through the outer-side channels 4 can be achieved. Furthermore, by virtue of the four protruding parts 31 and the outer pipe 2 making contact in the circumferential direction, the four outer-side channels 4, which are divided up in the circumferential direction by the protruding parts 31 between the outer pipe 2 and the inner pipe 3, are formed.

As shown in FIG. 5, in a cross section of the straight-pipe part 11 orthogonal to the X direction, when D [mm] is defined as the maximum depth of each of the outer-side channels 4 and L [mm] is defined as the arc length of each of the outer-side channels 4 in the circumferential direction, the average value of the D/L values of all the outer-side channels 4 (the D/L average value) is greater than 0.09 and less than 0.20. That is, in a cross section orthogonal to the X direction, each of the outer-side channels 4 is formed such that it is shallow in the radial direction to a certain extent and wide in the circumferential direction.

Maximum depth D of each of the outer-side channels 4 in a cross section of the straight-pipe part 11 orthogonal to the X direction is derived by the maximum length in the radial direction between a virtual circumscribed circle 7 of the inner pipe 3 and the inner pipe 3. That is, in a cross section of the straight-pipe part 11 orthogonal to the X direction, the length in the radial direction between each of the outer-side channels 4 and the circumscribed circle 7 differs according to the location in the circumferential direction. The maximum value among these lengths in the radial direction is assigned as the maximum depth D of each of the outer-side channels 4. For example, in the situation in which a pipe having a diameter of approximately 19 mm is used as a pipe stock (refer to symbol 30 in FIG. 6) and it is worked to form the inner pipe 3, maximum depth D of each of the outer-side channels 4 can be set to, for example, 0.7-1.6 mm.

In a cross section of the straight-pipe part 11 orthogonal to the X direction, arc length L of each of the outer-side channels 4 in the circumferential direction is derived by the following method. That is, first, contact parts 5 between the protruding parts 31 and the outer pipe 2 are specified. Subsequently, along the circumscribed circle 7 of the inner pipe 3, the length of the arc from any of the contact parts 5 to the contact part 5 adjacent to that contact part 5 is measured. The length of this arc is assigned as arc length L of the outer-side channels 4 located between these contact parts 5. Here, because each of the protruding parts 31 is formed into a curved-surface shape that is curved such that it conforms to the inner-circumferential surface of the outer pipe 2, as shown in the enlarged view of the boundary periphery between the contact part 5 and the outer-side channel 4 in FIG. 4, at the boundary periphery between the outer-side channel 4 and the contact part 5, which is between the protruding part 31 and the outer pipe 2, a gap g between the protruding part 31 and the outer pipe 2 widens gradually in the radial direction as it approaches the center of the outer-side channel 4 in the circumferential direction.

On the other hand, because the size of the gap g between the protruding part 31 and the outer pipe 2 gradually narrows as it leads away from the center of the outer-side channel 4 in the circumferential direction, it is difficult to specifically specify the location at which the gap g between the protruding part 31 and the outer pipe 2 completely vanishes, i.e., the true end point of the contact part 5. Accordingly, in the present example, at the periphery of the boundary between the contact part 5 and the outer-side channel 4, the length of gap g in the radial direction becomes 4 and the location at which the gap can be recognized clearly is an end point 51 of the contact part 5. Furthermore, the length of the circumscribed circle 7 in the circumferential direction between the end point 51 of the contact part 5, which is located on one side of the outer-side channel 4 in the circumferential direction, and the end point 51 of the contact part 5, which is located on the other side, is assigned as arc length L of that outer-side channel 4 in the circumferential direction.

In a cross section of the straight-pipe part 11 orthogonal to the X direction, when r [mm] is defined as the radius of the circumscribed circle 7 of the inner pipe 3 and θ [°] is defined as the angle formed between virtual straight lines V, which connect the end points 51 of the contact parts 5 adjacent on both sides of the outer-side channel 4 in the circumferential direction and the center of the circumscribed circle 7, arc length L of the outer-side channel 4 in the circumferential direction can be derived by $L=2\pi r \times \theta/360$. For example, in the situation in which a pipe having a diameter of approximately 19 mm is used as the pipe stock (refer to the symbol 30 in FIG. 6) and it is worked to configure the inner pipe 3, in a cross section of the straight-pipe part 11 orthogonal to the X direction, arc length L of the outer-side channel 4 in the circumferential direction is, for example, 7-14 mm.

As shown in FIG. 5, in a cross section of the straight-pipe part 11 orthogonal to the X direction, the total of arc lengths L of the outer-side channels 4 in the circumferential direction is 60% or more of circumferential length C of the circumscribed circle 7 of the inner pipe 3. Thereby, the heat-exchanging performance of the straight-pipe part 11 is improved, and a reduction in the pressure drop is easy to achieve. From the viewpoint of ensuring the contact widths of the contact parts 5 between the inner pipe 3 and the outer pipe 2, in the present example, in a cross section of the straight-pipe part 11 orthogonal to the X direction, the total of arc lengths L of the outer-side channels 4 in the circumferential direction is preferably set to 90% or less of circumferential length C of the circumscribed circle 7 of the inner pipe 3. In addition, from the viewpoint of ensuring the contact widths of the contact parts 5, improving the heat-exchanging performance, and achieving a reduction in the pressure drop, in a cross section of the straight-pipe part 11 orthogonal to the X direction, the total of arc lengths L of the outer-side channels 4 in the circumferential direction is preferably set to 63% or more and 77% or less of circumferential length C of the circumscribed circle 7 of the inner pipe 3.

In a cross section of the straight-pipe part 11 orthogonal to the X direction, the total of the channel cross-sectional areas of the outer-side channels 4 is 5% or more of the channel cross-sectional area of the inner-side channel 6. Thereby, an improvement in the heat-exchanging performance of the straight-pipe part 11 and a reduction in the pressure drop of the refrigerant that flows through the outer-side channels 4 can be achieved. In addition, in a cross section of the straight-pipe part 11 orthogonal to the X direction, the total of the channel cross-sectional areas of the outer-side channels 4 is 30% or less of the channel cross-sectional area of the inner-side channel 6, which is preferable from the viewpoint of improving the manufacturability of the double pipe 1 and reducing the pressure drop of the refrigerant that flows through the inner-side channel 6. In a cross section of the straight-pipe part 11 orthogonal to the X direction, if an attempt is made to make the total of the channel cross-sectional areas of the outer-side channels 4 large, the depth of the outer-side channels 4 of the inner pipe 3 must be made quite large. However, if an attempt is made to make the total of the channel cross-sectional areas of the outer-side channels 4 large while maintaining the D/L average value at 0.09-0.20, there is a risk that it will lead to a deterioration in the manufacturability of the inner pipe 3 and to an increase in the pressure drop of the refrigerant that flows in the inner pipe 3. By setting the total of the channel cross-sectional areas of the outer-side channels 4 to 30% or less of the channel cross-sectional area of the inner-side channel 6, these problems can be avoided more easily. In addition, from the viewpoint of improving the manufacturability of the double pipe 1, improving the heat-exchanging performance of the straight-pipe part 11, reducing the pressure drop of the refrigerant that flows through the outer-side channels 4, increasing the manufacturability of the double pipe 1, and reducing the pressure drop of the refrigerant that flows through the inner-side channel 6, in a cross section of the straight-pipe part 11 orthogonal to the X direction, the total of the channel cross-sectional areas of the outer-side channels 4 is preferably 9% or more and 20% or less of the channel cross-sectional area of the inner-side channel 6.

In addition, as described above, the cross-sectional shape of the inner pipe 3 of the straight-pipe part 11 orthogonal to the X direction is substantially identical at every location in the X direction. For that reason, at every location in the X direction, maximum depths D of the outer-side channels 4 and arc lengths L of the outer-side channels 4 in the circumferential direction are substantially constant. Furthermore, in cross sections of every location at which the protruding parts 31 of the straight-pipe part 11 exist, the average value of the D/L values of all the outer-side channels 4 is greater than 0.09 and less than 0.20.

In the present example, the outer diameter of the outer pipe 2 is set to within the range of 15-30 mm, and the outer diameter of the circumscribed circle of the inner pipe 3 is set to within the range of 10-29 mm. In addition, the thickness of the outer pipe 2 and the thickness of the inner pipe 3 are set to be equal to each other.

The double pipe 1 of the present example is used by being incorporated in an air-conditioning system for an automobile or the like. The air-conditioning system comprises the condenser, the evaporator, the compressor, the expansion valve, and the circulation channel, which couples these, and the double pipe 1 is disposed in that circulation channel. The double pipe 1 is incorporated in the circulation channel such that the low-temperature/low-pressure gas refrigerant discharged from the evaporator flows through the inner-side channel 6 in the broken-line arrow direction in FIG. 2 and the high-temperature/high-pressure liquid refrigerant discharged from the condenser flows through the outer-side channels 4 in the solid-line arrow direction in FIG. 2, i.e., in a direction in opposition to the low-temperature/low-pressure gas refrigerant that flows in the inner pipe 3. For example, a fluorocarbon-based refrigerant, such as R-134a, R-1234yf, or the like, or a $CO_2$ refrigerant can be used as the refrigerant.

Next, the functions and effects of the present example will be explained.

In the straight-pipe part 11 of the double pipe 1 of the present example, the inner-circumferential surface of the outer pipe 2 and the protruding parts 31 of the inner pipe 3 are in contact, and the outer-side channels 4, which are partitioned at a plurality of locations in the circumferential direction, are formed between the outer pipe 2 and the inner pipe 3. In this manner, in the straight-pipe part 11, by forming the outer-side channels 4 such that they are divided up in the circumferential direction, the flow velocity of the refrigerant flowing through the outer-side channels 4 in the straight-pipe part 11 can be ensured, and thereby the heat-exchanging performance of the straight-pipe part 11 can be improved.

In addition, in a cross section of the straight-pipe part 11 orthogonal to the X direction, when D [mm] is defined as the maximum depth of each of the outer-side channels 4 and L [mm] is defined as the arc length of each of the outer-side channels 4 in the circumferential direction, the average value of the D/L values of all the outer-side channels 4 is greater than 0.09 and less than 0.20. That is, in the straight-pipe part 11, each of the outer-side channels 4 is formed such that its depth becomes small to a certain extent and its arc length in the circumferential direction becomes long. For that reason, in the straight-pipe part 11, the contact surface area between the refrigerant that flows in the outer-side channels 4 and the outer pipe 2 and the contact surface area between the refrigerant that flows in the outer-side channels 4 and the inner pipe 3 can be increased. Thereby, the heat-exchanging performance of the straight-pipe part 11 can be improved.

In addition, in a cross section of the straight-pipe part 11, by virtue of setting the average value of the D/L values of all the outer-side channels 4 to a value that is greater than 0.09, an increase in the pressure drop of the refrigerant that flows in each of the outer-side channels 4 in the straight-pipe part 11 can be curtailed. Furthermore, in a cross section of the straight-pipe part 11, by setting the above-mentioned average value to a value of less than 0.20, an increase in the pressure drop of the refrigerant that flows in the inner-side channel 6 in the straight-pipe part 11 can be curtailed.

In addition, by swaging the outer pipe 2 toward the inner pipe 3, the outer pipe 2 and the protruding parts 31 make contact. Thereby, the outer pipe 2 and the protruding parts 31 can easily be brought directly (mechanically) into contact, and thereby the manufacturability of the double pipe 1, which comprises the outer-side channels 4 partitioned at the plurality of locations in the circumferential direction, can be improved.

In addition, in the straight-pipe part 11, the inner pipe 3 comprises the protruding parts 31 at four locations in the circumferential direction. For that reason, the flow velocity in the outer-side channels 4 of the straight-pipe part 11 can be easily increased, and thereby heat-exchanging performance can be greatly improved beyond that of the situation in which the number of the protruding parts 31 in the straight-pipe part 11 is set to three locations or fewer. In addition, by configuring four of the protruding parts 31 in the straight-pipe part 11, the pressure drop of the refrigerant that flows through the interior of the outer-side channels 4 becoming excessively large can be curtailed.

In addition, with regard to the cross-sectional shape of the inner pipe 3, the plurality of the protruding parts 31 is formed equispaced. For that reason, the refrigerant flow volumes of the outer-side channels 4 become equal in the circumferential direction. Consequently, it becomes easy to curtail heat-exchanging nonuniformity between the refrigerant that flows through the outer-side channels 4 and the refrigerant that flows through the channel inside the inner pipe 3.

In addition, in the straight-pipe part 11, the spiral angle of each of the protruding parts 31 is 20° or more and 60° or less. By setting the spiral angle to 20° or more, it is easy to increase the contact portions between the outer-side channels 4 and the inner pipe 3, and thereby it becomes easy to improve the heat-exchanging performance. By setting the spiral angle to 60° or less, the pressure drop of the refrigerant that flows in the outer-side channels 4 becoming excessively large can be curtailed.

According to the present example as described above, a double pipe for a heat exchanger can be provided in which the channel cross-sectional shape of the outer-side channels in the straight-pipe part are optimized, and thereby heat-exchanging performance can be improved over that in the past.

Working Example 2

Figure 7:
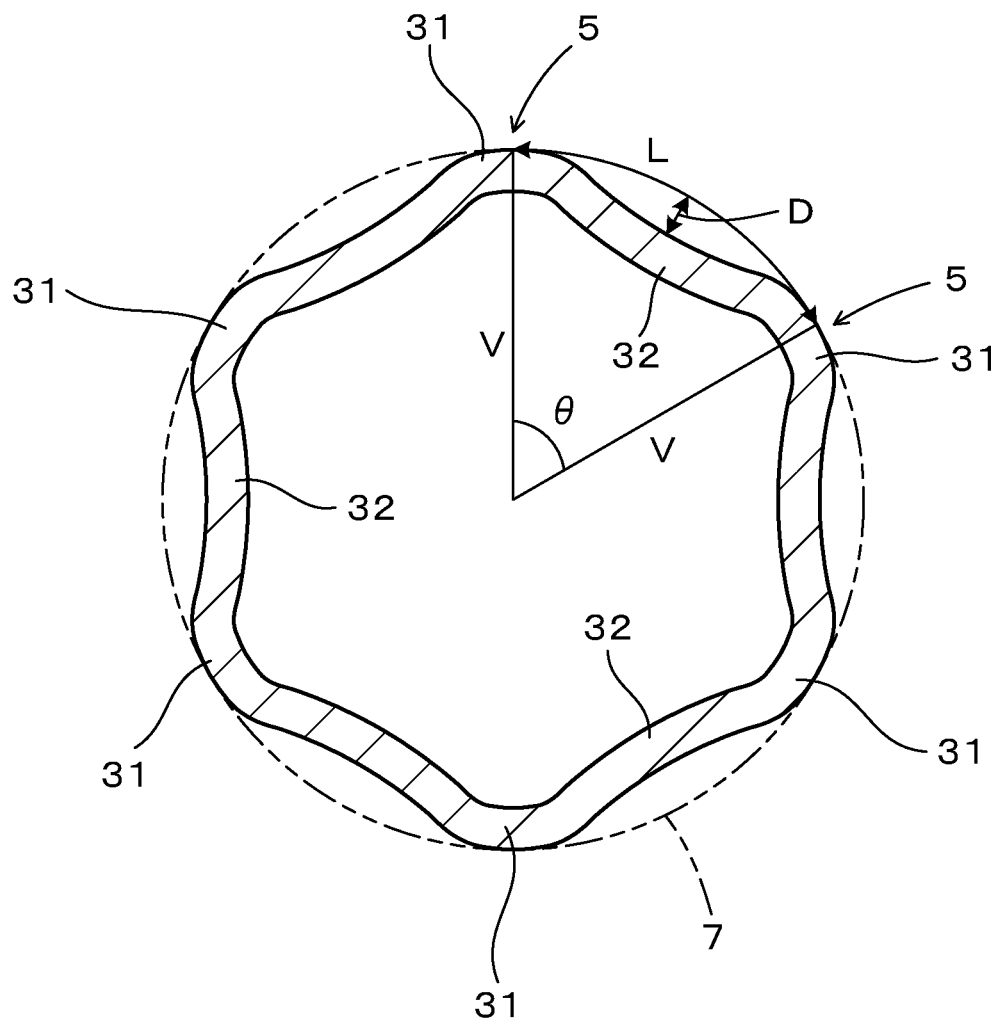
FIG. 7 is a cross-sectional view of the inner pipe for explaining maximum depth D of the outer-side channels and arc length L in the circumferential direction according to Working Example 2.

As shown in FIG. 7, the present example is an example in which, in the straight-pipe part 11, the protruding parts 31 are formed at six locations of the inner pipe 3. Although not shown in the drawing, all the protruding parts 31 at the six locations make contact with the inner-circumferential surface of the outer pipe 2. In the present example as well, when D [mm] is defined as the maximum depth of each of the outer-side channels 4 and L [mm] is defined as the arc length of each of the outer-side channels 4 in the circumferential direction, the average value of the D/L values of all the outer-side channels 4 is greater than 0.09 and less than 0.20.

Otherwise, it is the same as Working Example 1.

It is noted that, among the symbols used subsequent to the present example, those symbols that are the same as the symbols used in the previous working example indicate structural elements that are the same as the structural elements in the previous working example, unless otherwise particularly indicated.

In the present example, because the protruding parts 31 are formed in the straight-pipe part 11 at six locations of the inner pipe 3, the outer-side channels 4 are formed at six locations in the circumferential direction. For that reason, the flow velocity of the refrigerant that flows in the outer-side channels 4 in the straight-pipe part 11 is greatly increased easily. In addition, by setting the number of the protruding parts 31 in the straight-pipe part 11 to six locations or fewer, the pressure drop of the refrigerant flowing in the outer-side channels 4 of the straight-pipe part 11 becoming excessively large can be curtailed.

Otherwise, the double pipe of the present example has the same functions and effects as those of Working Example 1.

Test Example 1

The present example is an example in which, in the situation in which the average value of the D/L values (the D/L average value) of all the outer-side channels 4 in the double pipe 1 was variously modified, the degree of the heat-exchanging performance between the refrigerant that flows through the outer-side channels 4 and the refrigerant that flows through the inner-side channel 6 was evaluated by a simulation. As the analysis software, this simulation used "SolidWorks® Flow Simulation" made by Dassault Systèmes SolidWorks Corporation.

Figure 8:
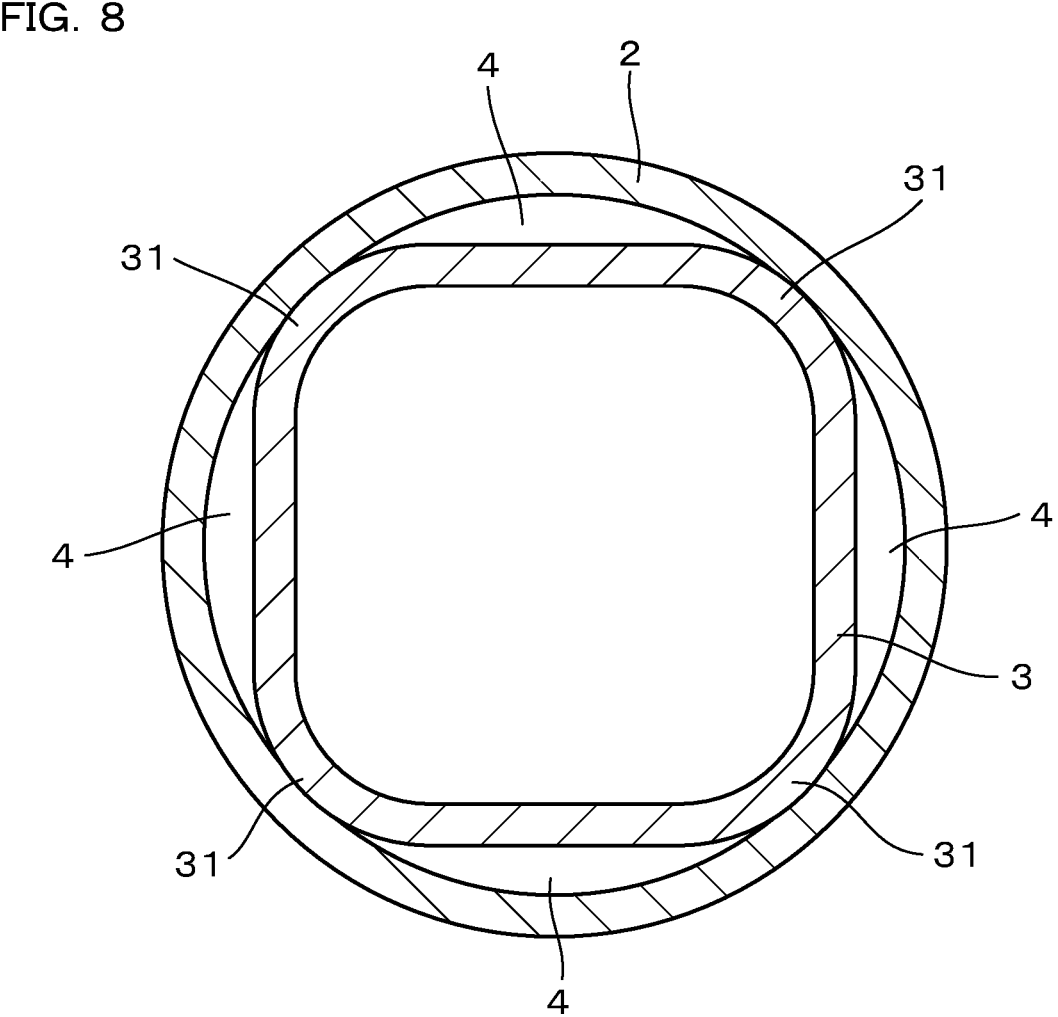
FIG. 8 is a cross-sectional view of the double pipe of sample 1, in which the D/L average value is 0.08, according to Test Examples 1-3.
Figure 9:
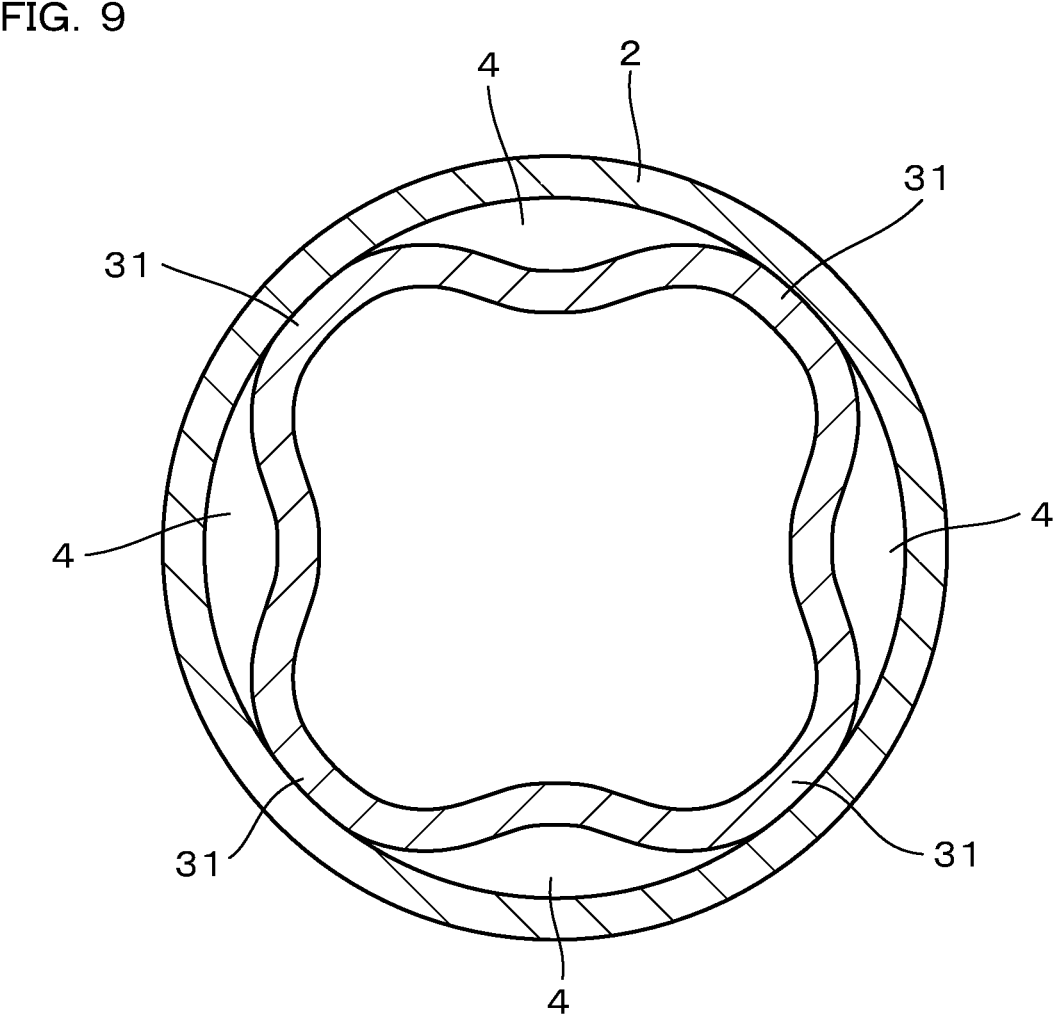
FIG. 9 is a cross-sectional view of the double pipe of sample 5, in which the D/L average value is 0.15, according to Test Examples 1-3.
Figure 10:
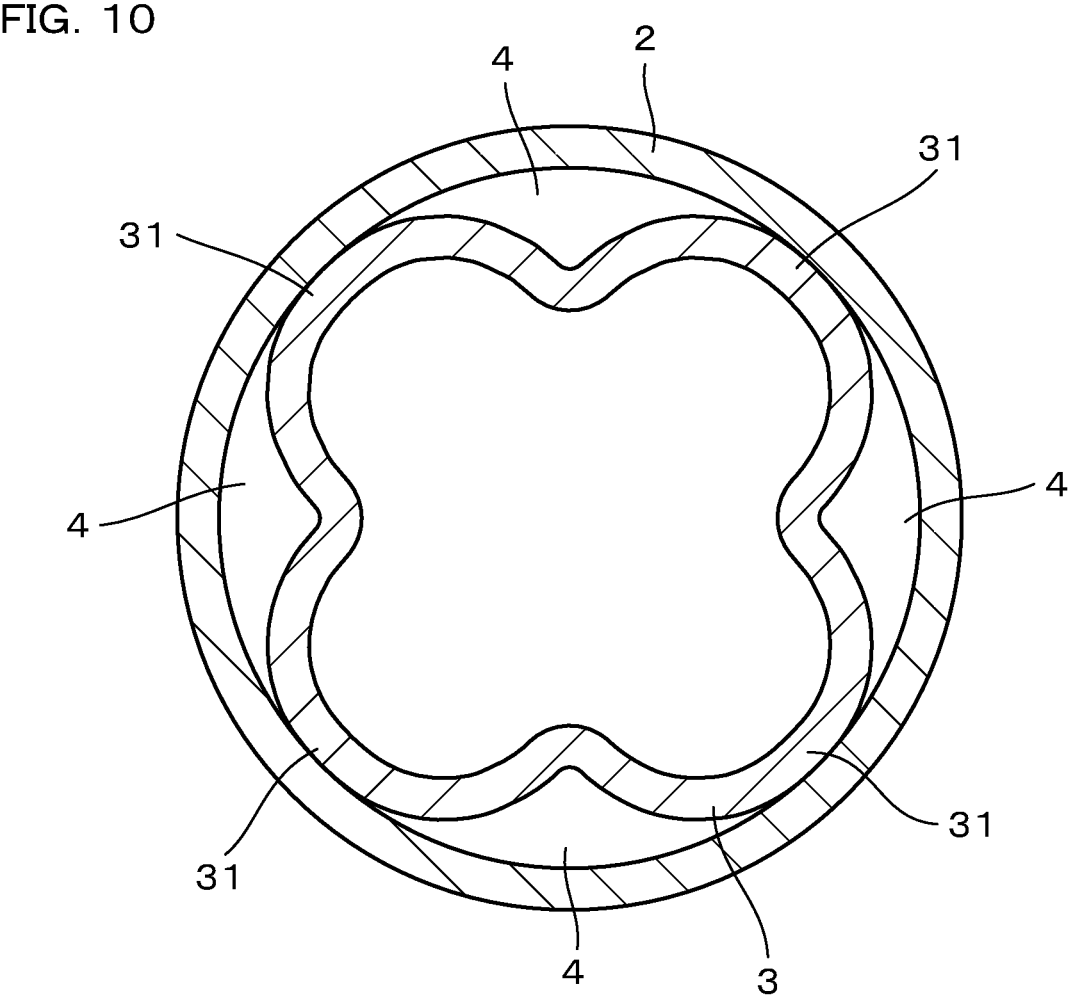
FIG. 10 is a cross-sectional view of the double pipe of sample 7, in which the D/L average value is 0.20, according to Test Examples 1-3.

In the present example, samples 1-7, in which the D/L average value was variously modified while the basic structure was the same as that in Working Example 1, and sample 8, which was for comparison, were prepared. Samples 1-7 were based on a model having the protruding parts 31 at four locations in the circumferential direction and wherein the protruding parts 31 made contact with the inner-circumferential surface of the outer pipe 2, the same as in the first embodiment. The D/L average value of sample 1 was set to 0.08, the D/L average value of sample 2 was set to 0.09, the D/L average value of sample 3 was set to 0.10, the D/L average value of sample 4 was set to 0.14, the D/L average value of sample 5 was set to 0.15, the D/L average value of sample 6 was set to 0.16, and the D/L average value of sample 7 was set to 0.20. Sample 1, which has a D/L average value of 0.08, is shown in FIG. 8; sample 5, which has a D/L average value of 0.15, is shown in FIG. 9; and sample 7, which has a D/L average value of 0.20, is shown in FIG. 10.

Figure 11:
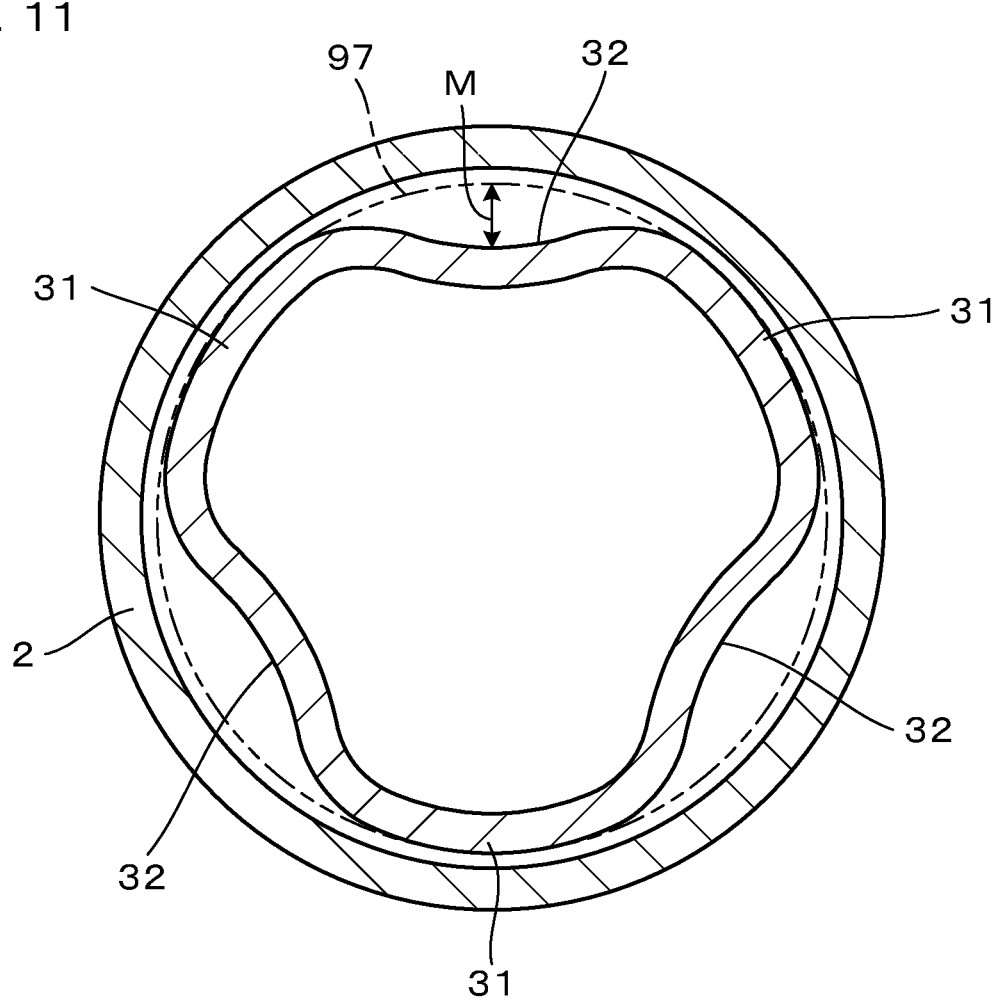
FIG. 11 is a cross-sectional view of the double pipe of sample 8, as a comparative sample, according to Test Examples 1-3.

On the other hand, as shown in FIG. 11, sample 8 is based on a model in which: the protruding parts 31 are at three locations in the circumferential direction; the diameter of a circumscribed circle of the inner pipe 3 is smaller than the diameter of an inscribed circle of the outer pipe 2; and the inner pipe 3 does not make contact with the outer pipe 2. With regard to sample 8, maximum length M in the radial direction between each of the helical recessed parts 32 and a circumscribed circle 97 of the inner pipe 3 was assumed to be 1.7 mm. It is noted that sample 8 was assumed to be a double pipe that is already generally in circulation.

Figure 12:
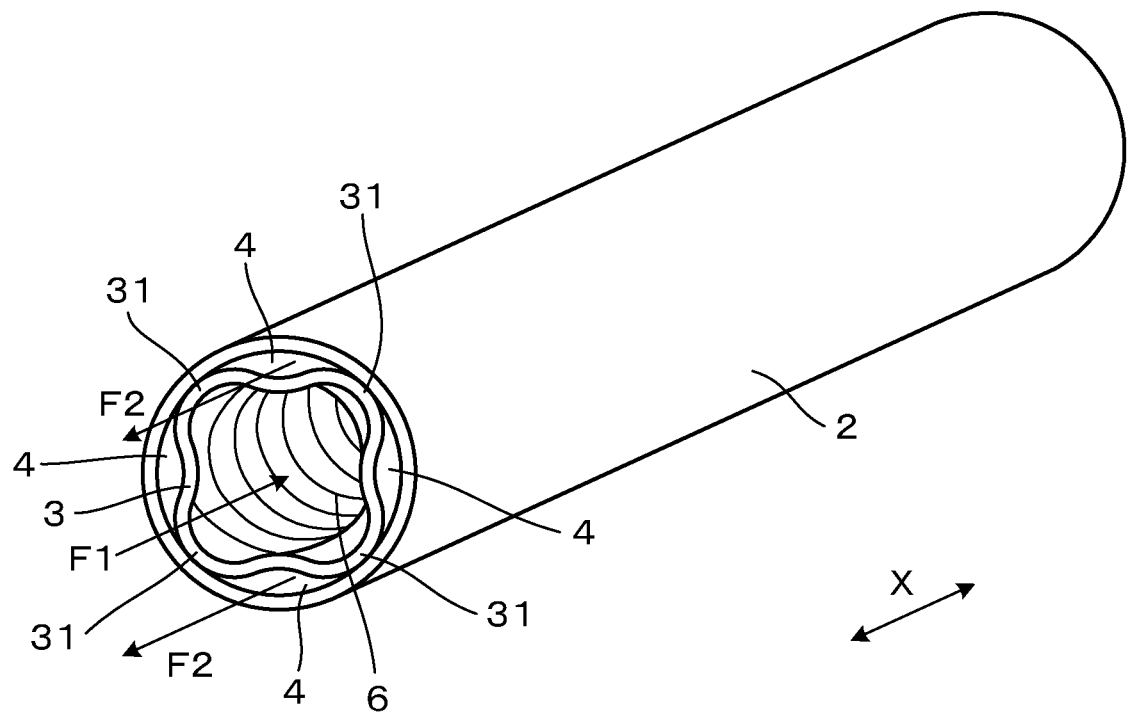
FIG. 12 is an overall oblique view of the double pipe of sample 5 according to Test Examples 1-3.

In each of the samples, the outer pipe 2 had a smooth-pipe shape in which the entirety of the outer pipe 2 was circular in cross section, and the inner pipe 3 had the protruding parts 31 having a spiral angle of 40°. Furthermore, an example of sample 5, in which the D/L average value was 0.15, is shown in FIG. 12, and likewise, in each of the samples, the entirety was formed in a straight shape, and the protruding parts 31 of the inner pipe 3 of each of the samples was formed across the entirety in the X direction. In addition, the diameter of the outer-circumferential surface of the outer pipe 2 was set to approximately 21 mm, the thickness of the outer pipe 2 and the thickness of the inner pipe 3 were each set to 1.2 mm, and the length in the X direction was set to 500 mm.

Furthermore, a simulation was conducted that assumed the situation in which, as shown by the one example in FIG. 12, each of the samples was disposed in an environment in which the outside air temperature was 23°, refrigerant F1 was introduced to the inner-side channel 6 from one side in the X direction, and refrigerant F2 was introduced to the outer-side channels 4 from the other side in the X direction. In this simulation, the initial temperature of the refrigerant F2 that flowed into the outer-side channels 4 (the temperature at the entrances of the outer-side channels 4) was set to 50° C., the initial temperature of the refrigerant F1 that flowed to the inner-side channel 6 was set to 11° C., and the mass flow rate of the refrigerants F1, F2 that flowed into the outer-side channels 4 and the inner-side channel 6 was set to 234 kg/h. In addition, the pressure of the refrigerant F2 at the entrances of the outer-side channels 4 was set to 1,499 kPa, and the pressure of the refrigerant F1 at the entrance of the inner-side channel 6 was set to 199 kPa. It was assumed that HFC-134a was used as the refrigerants F1, F2 that flowed in the outer-side channels 4 and the inner-side channel 6.

Furthermore, in each of the samples, the amount of heat absorption of the refrigerant F1 that flowed in the inner-side channel 6 was calculated as an index indicating the heat-exchanging performance. The amount of heat absorption of the refrigerant F1 that flowed in the inner-side channel 6 was derived by the product of: the enthalpy difference, which is the difference between the enthalpy calculated based on the pressure and the temperature of the refrigerant that flowed through the exit of the inner-side channel 6 and the enthalpy calculated based on the pressure and the temperature of the refrigerant that flowed through the entrance of the inner-side channel 6; and the flow rate of the refrigerant that flowed through the inner-side channel 6.

Figure 13:
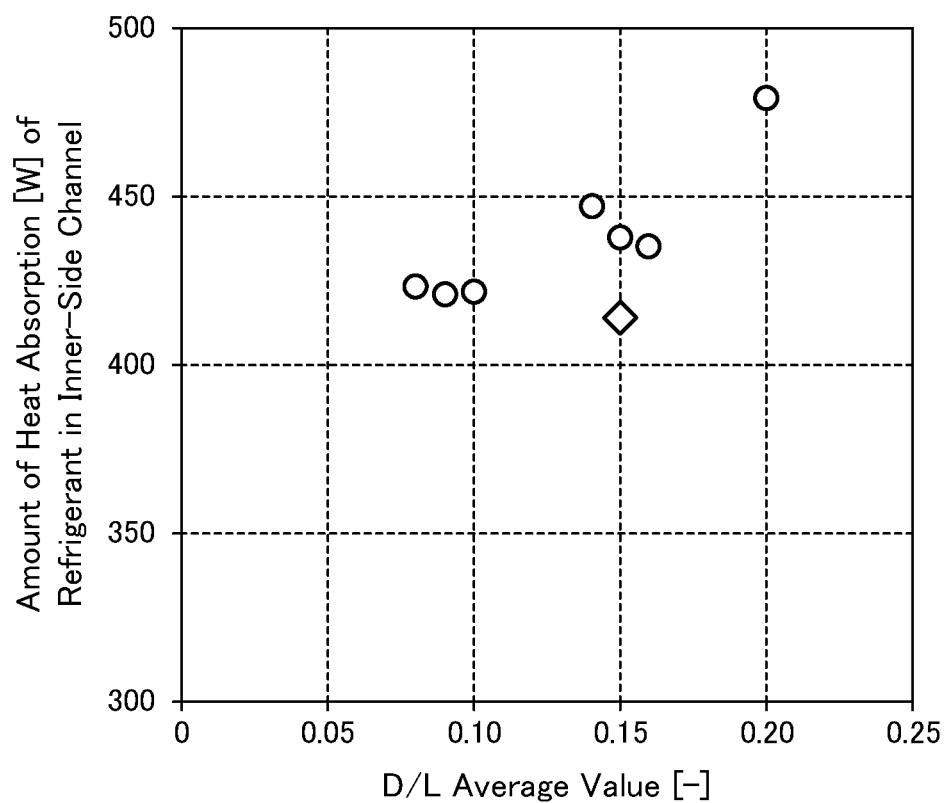
FIG. 13 is a graph that shows the relationship between the D/L average value and the amount of heat absorption of a refrigerant in an inner-side channel according to Test Example 1.

The results are shown in FIG. 13. It is noted that, in FIG. 13, the results of samples 1-7 were plotted using the "○" symbol, and the result of sample 8, as the comparative sample, was plotted using the "◇" symbol. With regard to sample 8, the channels between the outer pipe 2 and the inner pipe 3 were connected over the entire circumference, and therefore the D/L average value could not be defined or calculated using the same method as that used in samples 1-7; however, in FIG. 13, for the sake of convenience, the result of sample 8 at the location at which the D/L average value was 0.15 was plotted.

With regard to samples 1-7 in the present example according to FIG. 13, it was understood that the amount of heat absorption of the refrigerant that flows in the inner-side channel 6 becomes higher than that of sample 8, i.e., heat-exchanging performance was higher. Based on these results, it was understood that, in the straight-pipe part 11, by virtue of forming the protruding parts 31 at four locations in the circumferential direction, bringing the protruding parts 31 into contact with the outer pipe 2, and forming the outer-side channels 4 at four locations in the circumferential direction, heat-exchanging performance was improved over sample 8, in which the protruding parts 31 were formed at three locations in the circumferential direction and the protruding parts 31 were not brought into contact with the outer pipe 2. Furthermore, based on FIG. 13, it was understood that, by virtue of setting the D/L average value to 0.14 or more, heat-exchanging performance was greatly improved.

Test Example 2

The present example is an example in which the pressure drop of the refrigerant that flows in the outer-side channels 4 was evaluated by simulation in samples 1-8 of Test Example 1. The "SolidWorks® Flow Simulation" made by Dassault Systèmes SolidWorks Corporation was used as the analysis software in the simulation of the present example, the same as in Test Example 1. The structures and calculation conditions of samples 1-8 were the same as those in Test Example 1.

In the present example, the difference between the pressure of the refrigerant that flowed through the entrance portions of the outer-side channels 4 and the pressure of the refrigerant that flowed through the exit portions of the outer-side channels 4 was taken as the pressure drop of the refrigerant in the outer-side channels 4.

Figure 14:
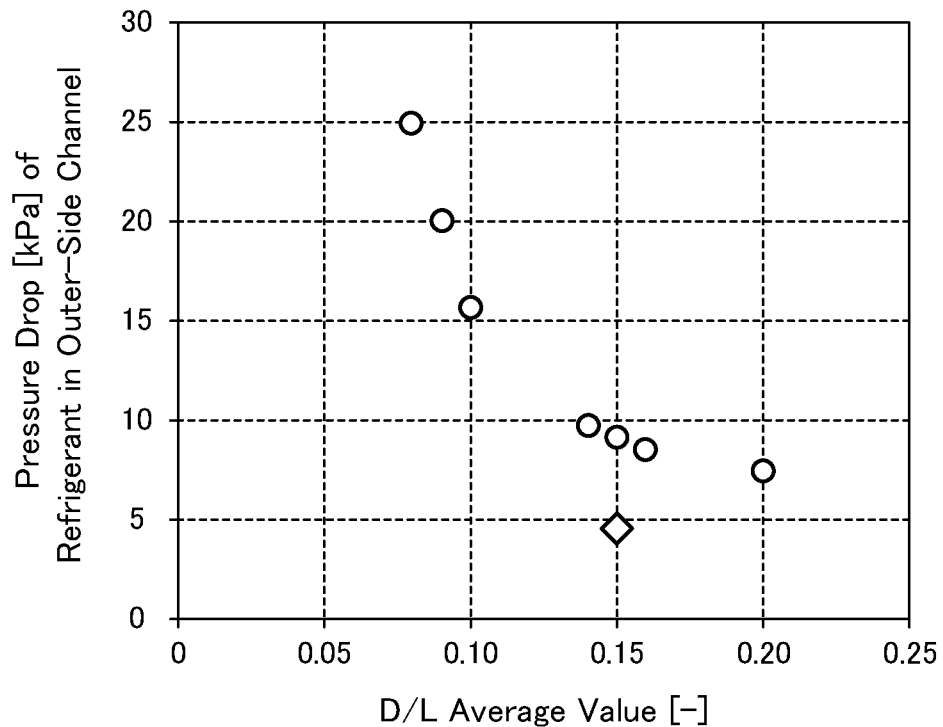
FIG. 14 is a graph that shows the relationship between the D/L average value and the pressure drop of the refrigerant in the outer-side channels according to Test Example 2.

The results are shown in FIG. 14.

As can be understood from FIG. 14, by setting the D/L average value to a value of greater than 0.09, the pressure drop of the refrigerant in the outer-side channels 4 could be kept to less than 20 kPa. On the other hand, it was understood that, in embodiments in which the D/L average value was 0.09 or less, the pressure drop of the refrigerant in the outer-side channels 4 rose abruptly. Furthermore, it was understood that, from the viewpoint of reducing the pressure drop of the refrigerant in the outer-side channels 4, the D/L average value is preferably set to a value of greater than 0.10.

Test Example 3

The present example is an example in which the pressure drop of the refrigerant that flows in the inner-side channel 6 was evaluated by simulation in samples 1-8 of Test Examples 1, 2. The "SolidWorks® Flow Simulation" made by Dassault Systèmes SolidWorks Corporation was used as the analysis software in the simulation of the present example, the same as in Test Example 1. The structures and calculation conditions of samples 1-8 were the same as those in Test Example 1.

In the present example, the difference between the pressure of the refrigerant that flowed through the entrance portion of the inner-side channel 6 and the pressure of the refrigerant that flowed through the exit portion of the inner-side channel 6 was taken as the pressure drop of the refrigerant in the inner-side channel 6.

Figure 15:
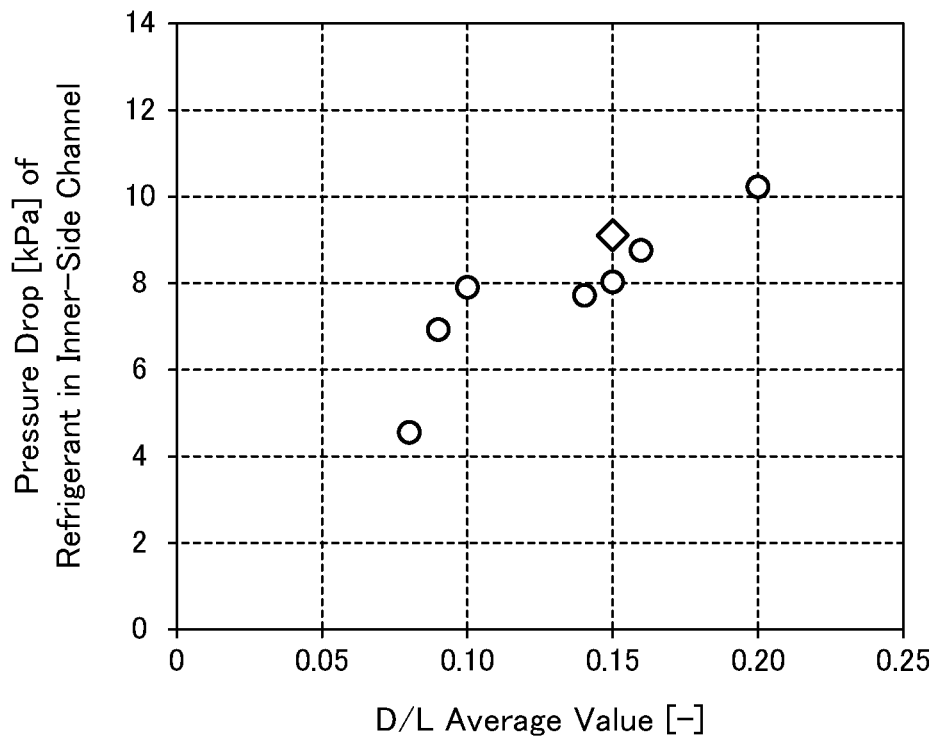
FIG. 15 is a graph that shows the relationship between the D/L average value and the pressure drop of the refrigerant in the inner-side channel according to Test Example 3.

The results are shown in FIG. 15.

According to FIG. 15, it was understood that, by setting the D/L average value to less than 0.20, the pressure drop of the refrigerant in the inner-side channel 6 could be reduced. In addition, it was understood that, by setting the D/L average value to less than 0.20, the pressure drop of the refrigerant in the inner-side channel 6 could be reduced beyond that of sample 8, which served as the comparative sample. Furthermore, it was understood that, from the viewpoint of reducing the pressure drop of the refrigerant in the inner-side channel 6, the D/L average value is preferably set to less than 0.16.

The present invention is not limited to the above-mentioned working examples and can be applied to various embodiments within a range that does not depart from the gist thereof. For example, the manufacturing method of the inner pipe 3 comprising the protruding parts 31 and the helical recessed parts 32 is not limited to the method described in Working Example 1. For example, the inner pipe 3 comprising the protruding parts 31 and the helical recessed parts 32 can be manufactured by linearly drawing a smooth pipe, which is circular in cross section and is the raw material, while rotating dies having inner holes, which have a shape that corresponds to the helical recessed parts 32. In this situation, the regions in which the helical recessed parts 32 are not formed by the drawing work, i.e., the regions between the helical recessed parts 32 of the inner pipe 3 in the circumferential direction, become the protruding parts 31, which are formed such that they conform to the helical recessed parts 32.

The invention claimed is:

1. A double pipe for a heat exchanger having a double-pipe structure, in which an inner pipe is disposed in an interior of an outer pipe, to effect heat exchange between a fluid that flows in an interior of the inner pipe and a fluid that flows between the inner pipe and the outer pipe, wherein:
   in a straight-pipe part of the double pipe, the inner pipe comprises a plurality of protruding parts extending in a longitudinal direction and curved to protrude toward an outer-circumference side and a plurality of helical recessed parts respectively provided between the protruding parts and curved so as to protrude toward an inner-circumference side;
   the protruding parts are helically offset in the longitudinal direction;
   the helical recessed parts are helically offset in the longitudinal direction;
   boundary parts are respectively formed in an angular shape between the protruding parts and the helical recessed parts;
   in a cross section of the straight-pipe part orthogonal to the longitudinal direction, an inner-circumferential surface of the outer pipe is circular;
   in the straight-pipe part, the inner-circumferential surface of the outer pipe contacts the protruding parts of the inner pipe, and outer-side channels, which are partitioned at a plurality of locations in a circumferential direction of the double pipe, are formed between the outer pipe and the inner pipe; and
   in the cross section of the straight-pipe part orthogonal to the longitudinal direction, D is defined as a maximum depth of each of the outer-side channels in millimeters, L is defined as an arc length of each of the outer-side channels in the circumferential direction in millimeters, and an average value of D/L values of all the outer-side channels is greater than 0.09 and less than 0.20.

2. The double pipe according to claim 1, wherein the outer pipe contacts the protruding parts owing to the outer pipe being swaged toward the inner pipe.

3. The double pipe according to claim 1, wherein, in the cross section of the straight-pipe part orthogonal to the longitudinal direction, a total of the arc lengths (L) of the outer-side channels has a length of 60% or more of a circumferential length (C) of a virtual circumscribed circle of the inner pipe.

4. The double pipe according to claim 1, wherein, in the straight-pipe part, the number of the protruding parts provided on the inner pipe is four or more and six or fewer.

5. The double pipe according to claim 1, wherein, in the straight-pipe part, a spiral angle of each of the protruding parts is 20° or more and 60° or less.

6. The double pipe according to claim 1, wherein, in the cross section of the straight-pipe part orthogonal to the longitudinal direction, a total of the arc lengths (L) of the outer-side channels has a length of 90% or less of a circumferential length (C) of a virtual circumscribed circle of the inner pipe.

7. The double pipe according to claim 1, wherein, in the cross section of the straight-pipe part orthogonal to the longitudinal direction, a total of channel cross-sectional areas of the outer-side channels is 5% or more and 30% or less of a channel cross-sectional area of the inner pipe.

8. The double pipe according to claim 2, wherein, in the cross section of the straight-pipe part orthogonal to the longitudinal direction, a total length of the arc lengths (L) of the outer-side channels is 60% or more of circumferential length (C) of a virtual circumscribed circle of the inner pipe.

9. The double pipe according to claim 8, wherein, in the straight-pipe part, four to six of the protruding parts are provided on the inner pipe.

10. The double pipe according to claim 9, wherein, in the straight-pipe part, a spiral angle of each of the protruding parts is 20°-60°.

11. The double pipe according to claim 10, wherein, in the cross section of the straight-pipe part orthogonal to the longitudinal direction, the total length of the arc lengths (L) of the outer-side channels is 90% or less of the circumferential length (C) of the virtual circumscribed circle of the inner pipe.

12. The double pipe according to claim 11, wherein, in the cross section of the straight-pipe part orthogonal to the longitudinal direction, a total of channel cross-sectional areas of the outer-side channels is 5%-30% of a channel cross-sectional area of the inner pipe.

13. A double pipe for a heat exchanger, comprising:
   a double-pipe structure having an inner pipe disposed in an interior of an outer pipe, the double-pipe structure being configured to effect heat exchange between a fluid that flows in an interior of the inner pipe and a fluid that flows in outer-side channels defined between the inner pipe and the outer pipe,
   wherein:
   in a straight-pipe portion of the double pipe, the inner pipe comprises a plurality of protruding parts extending in a helically offset manner along a longitudinal direction and a plurality of helical recessed parts respectively provided between the protruding parts, an inner-circumferential surface of the outer pipe directly contacts the protruding parts, and the outer-side channels are partitioned at a plurality of locations in a circumferential direction of the double pipe;
   the protruding parts are curved to protrude radially outward;
   the helical recessed parts are curved so as to protrude radially inward;
   boundary parts are respectively formed in an angular shape between the protruding parts and the helical recessed parts; and
   in a cross section of the straight-pipe portion orthogonal to the longitudinal direction, the inner-circumferential surface of the outer pipe is circular, and an average value of D/L values of all the outer-side channels is greater than 0.09 and less than 0.20, wherein D is defined as a maximum depth of each of the outer-side channels and L is defined as an arc length of each of the outer-side channels in the circumferential direction.

14. The double pipe according to claim 13, wherein, in the cross section of the straight-pipe portion orthogonal to the longitudinal direction, a total length of the arc lengths (L) of the outer-side channels is 60%-90% of circumferential length (C) of a virtual circumscribed circle of the inner pipe.

15. The double pipe according to claim 14, wherein, in the straight-pipe portion, four to six of the protruding parts are provided on the inner pipe.

16. The double pipe according to claim 15, wherein, in the straight-pipe portion, a spiral angle of each of the protruding parts is 20°-60°.

17. The double pipe according to claim 16, wherein, in the cross section of the straight-pipe portion orthogonal to the longitudinal direction, a total of channel cross-sectional areas of the outer-side channels is 5%-30% of a channel cross-sectional area of the inner pipe.

\* \* \* \* \*